(12) United States Patent
Lee et al.

(10) Patent No.: US 8,173,923 B2
(45) Date of Patent: May 8, 2012

(54) ROTARY SWITCH ASSEMBLY FOR AIR CONDITIONER IN VEHICLE

(75) Inventors: Jeongyeop Lee, Daejeon-si (KR); Yeongkil Kim, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 637 days.

(21) Appl. No.: 12/402,546

(22) Filed: Mar. 12, 2009

(65) Prior Publication Data
US 2009/0229387 A1    Sep. 17, 2009

(30) Foreign Application Priority Data

Mar. 17, 2008   (KR) .................. 10-2008-0024431
Mar. 6, 2009    (KR) .................. 10-2009-0019098

(51) Int. Cl.
*H01H 15/00* (2006.01)
(52) U.S. Cl. ....................................................... 200/543
(58) Field of Classification Search .................. 200/543, 200/564–565, 43.01, 11 R, 11 A, 11 D, 11 DA, 200/11 J, 11 TW, 567–569, 571, 336; 74/501.6, 74/507, 553
See application file for complete search history.

(56) References Cited

U.S. PATENT DOCUMENTS

| | | | |
|---|---|---|---|
| 5,127,280 A | 7/1992 | Terano et al. | |
| 5,218,879 A | 6/1993 | Lyons | |
| 5,235,866 A | 8/1993 | Truman et al. | |
| 5,245,886 A | 9/1993 | Truesdell et al. | |
| 5,589,671 A * | 12/1996 | Hackbarth et al. | 200/6 R |
| 6,374,696 B1 | 4/2002 | Blake et al. | |
| 6,506,984 B2 * | 1/2003 | Tomita | 200/11 R |
| 6,578,447 B1 * | 6/2003 | Fraser | 74/527 |
| 7,381,128 B2 | 6/2008 | Ogawa et al. | |
| 2009/0084220 A1 * | 4/2009 | Morizono et al. | 74/501.6 |

FOREIGN PATENT DOCUMENTS

| | | |
|---|---|---|
| CN | 1601427 | 3/2005 |
| DE | 19517781 | 9/1996 |
| DE | 10062533 | 9/2001 |
| EP | 0 669 217 | 8/1995 |
| EP | 0 743 587 | 11/1996 |
| EP | 1 000 785 | 5/2000 |
| JP | 08-152932 | 6/1996 |
| JP | 1999-007332 | 1/1999 |
| JP | 2003-016878 | 1/2003 |
| KR | 1020060074028 A | 7/2006 |
| KR | 10-2006-0115088 | 11/2006 |

\* cited by examiner

*Primary Examiner* — Edwin A. Leon
(74) *Attorney, Agent, or Firm* — Fulbright & Jaworski L.L.P.

(57) ABSTRACT

The present invention relates to a rotary switch assembly for an air conditioner in a vehicle, in which detent means is mounted on a holder joined to a front housing to mount a knob on the holder, so that a cable switch assembly for operating a cable to control the air conditioner can be used to various switches in common without regard to existence and nonexistence of a detent structure or positions of the detent structure and the rotary switch assembly can prevent a movement of the knob and effectively transfer a manipulation force of the knob to the cable switch assembly since the detent means is mounted on the holder adjacent to the knob.

16 Claims, 10 Drawing Sheets

[FIG. 1]
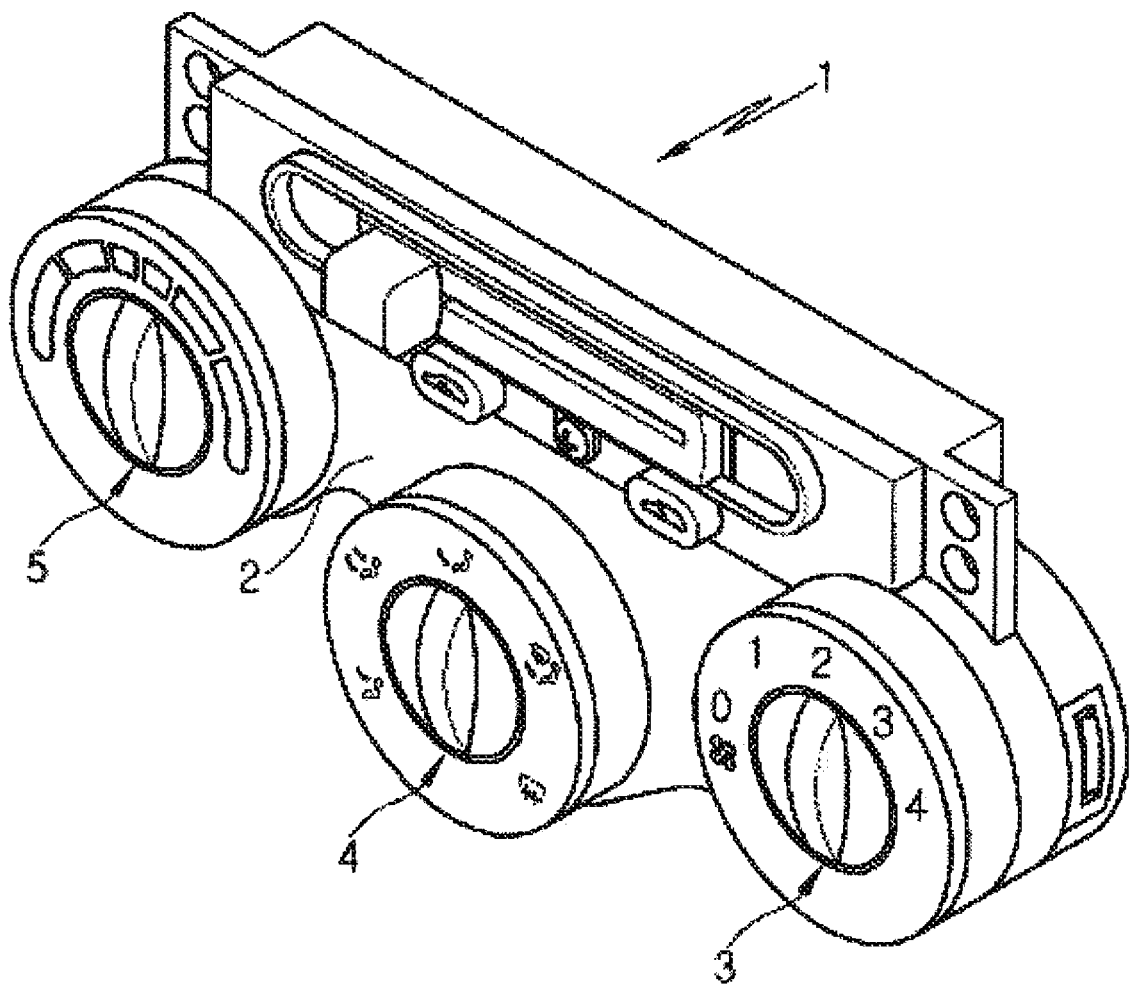
Prior Art

[FIG. 2]
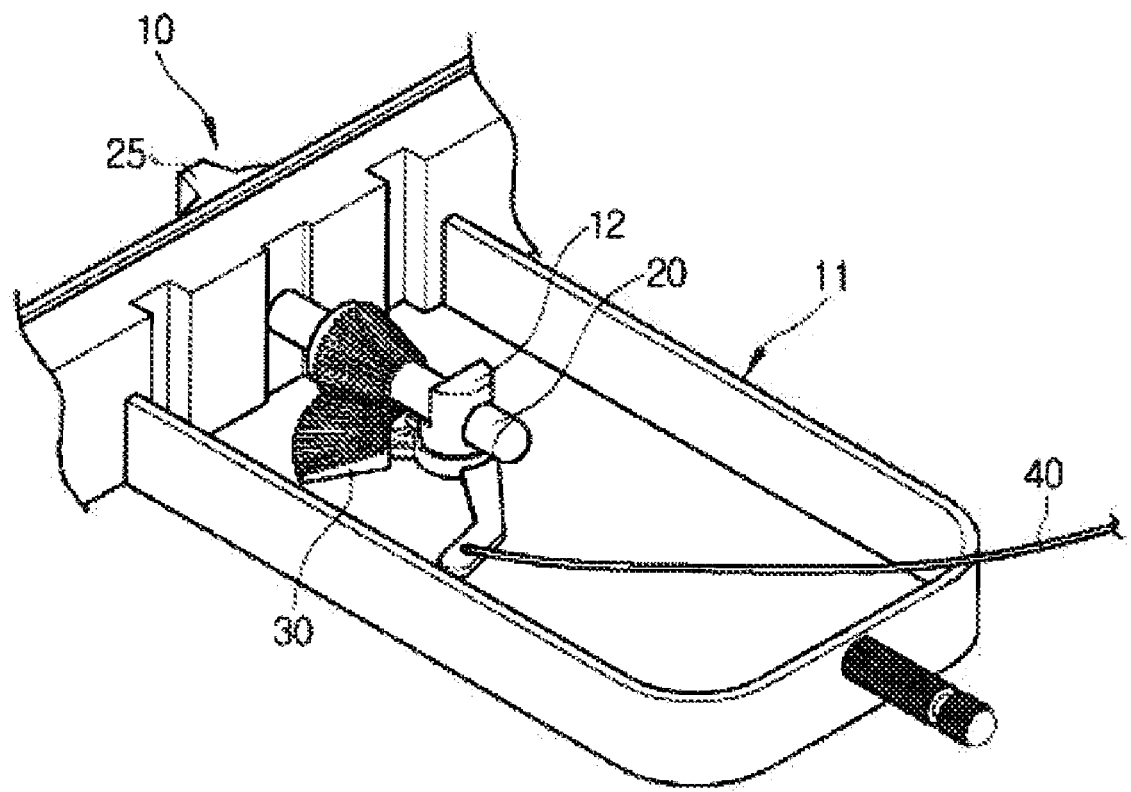
Prior Art

【FIG. 3a】
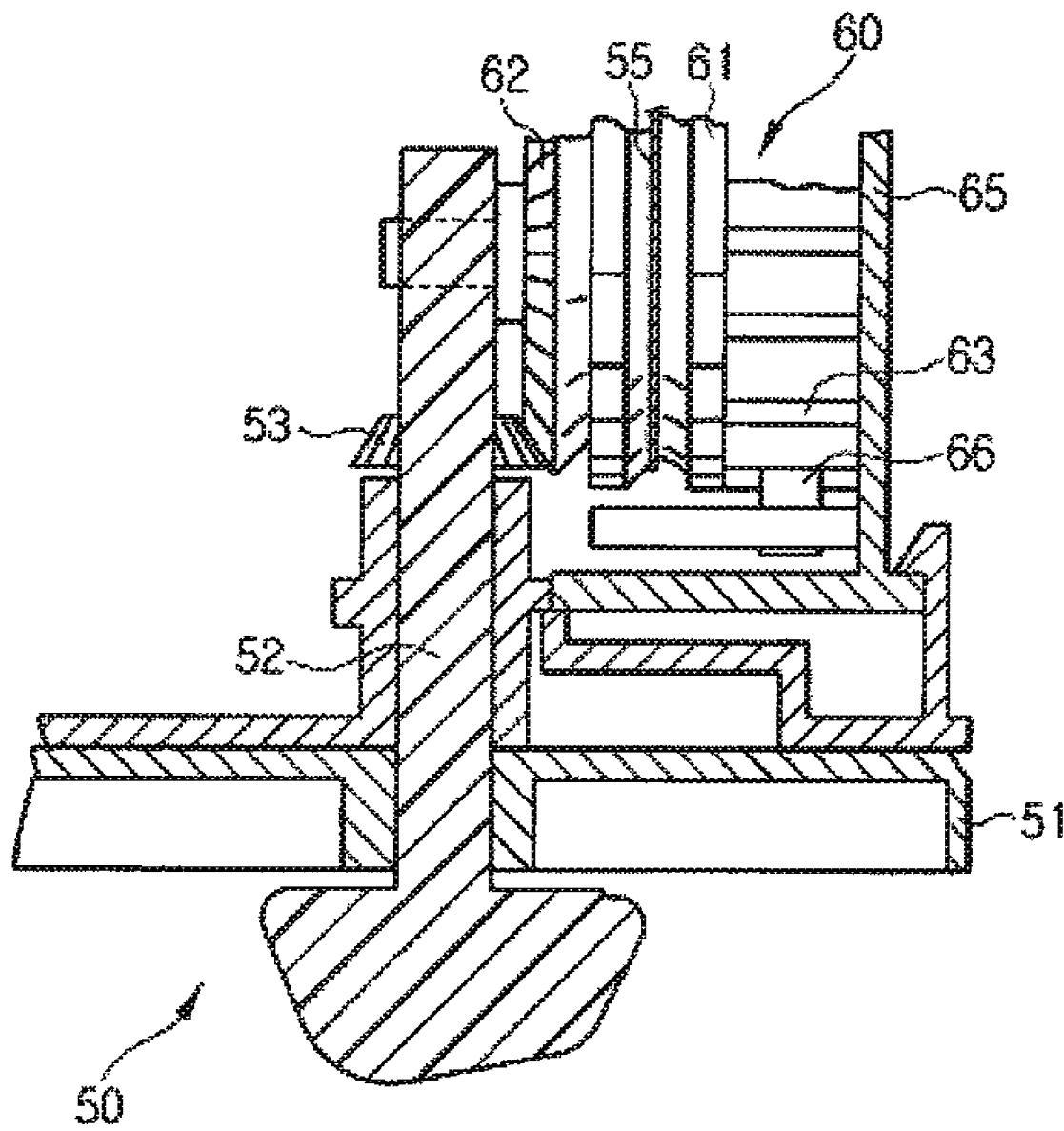
Prior Art

【FIG. 3b】
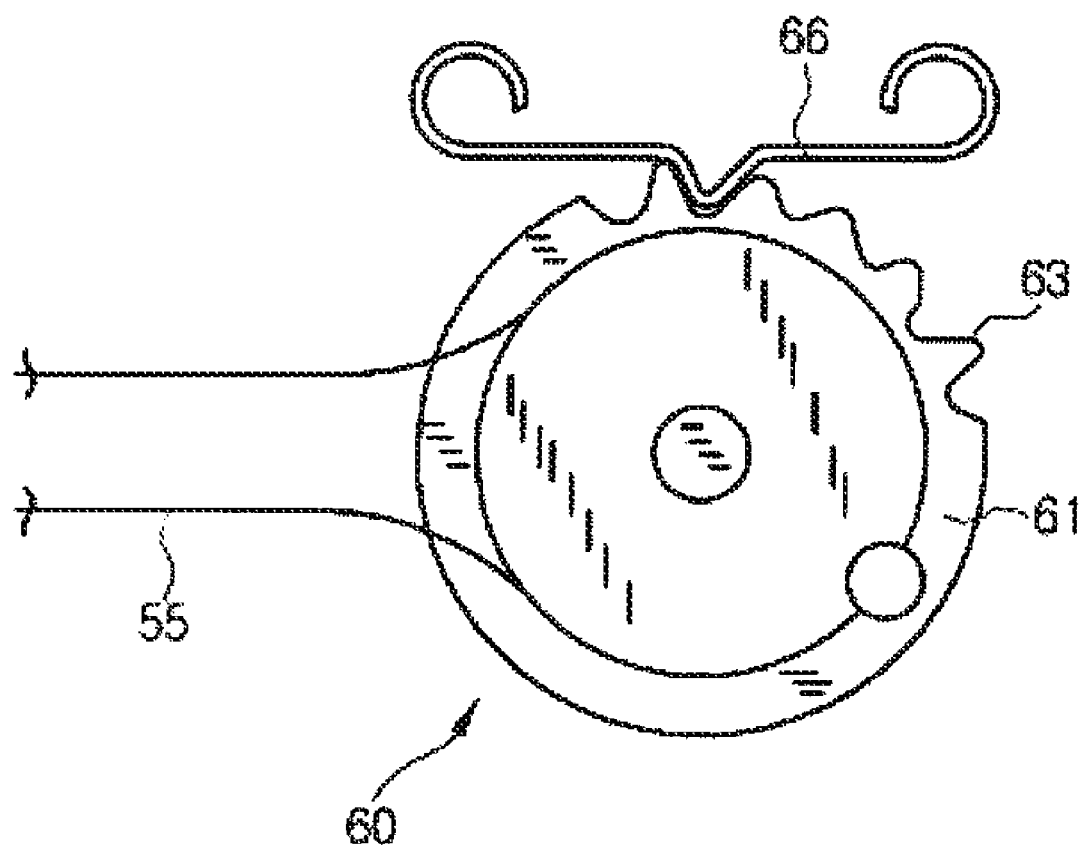
Prior Art

[ FIG. 4 ]
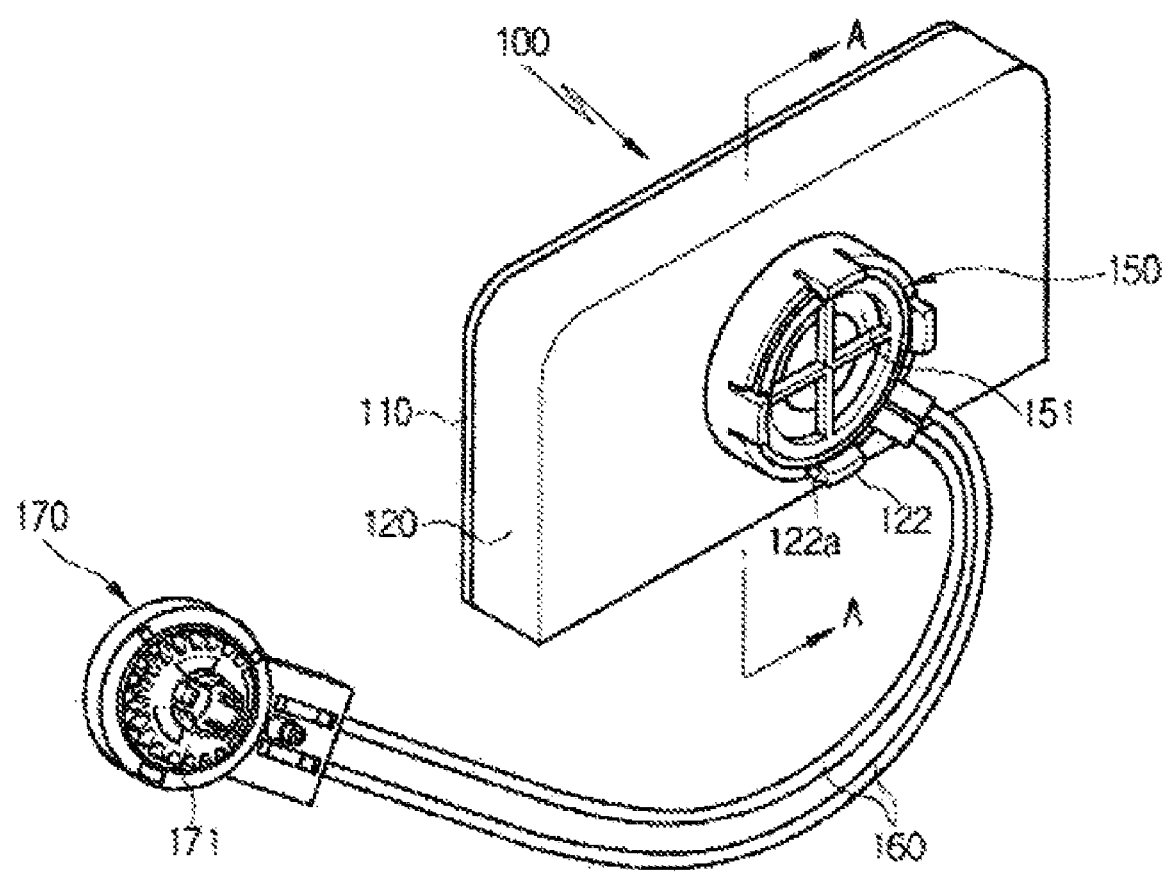

[FIG. 5]
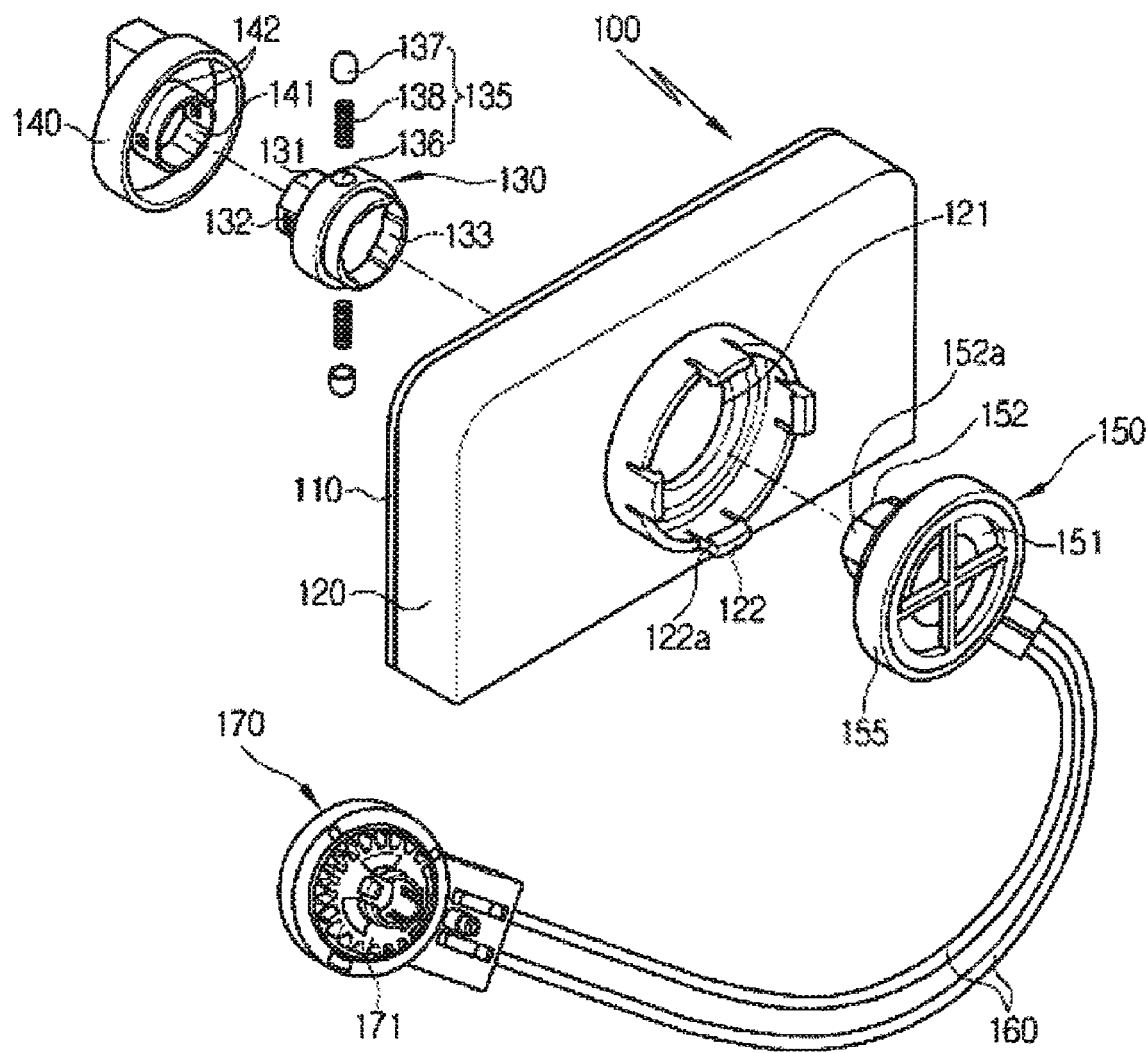

[FIG. 6]
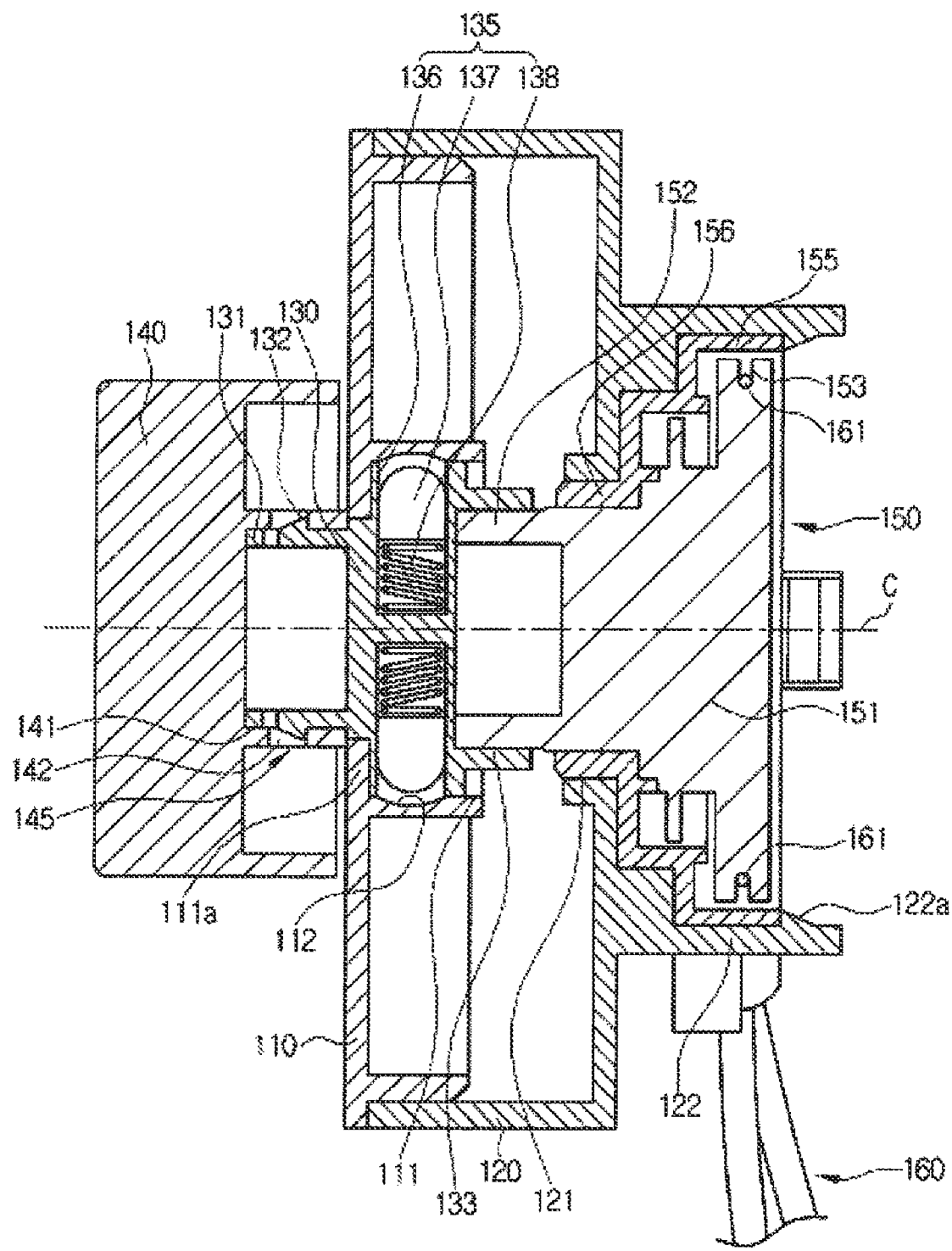

[FIG. 7]
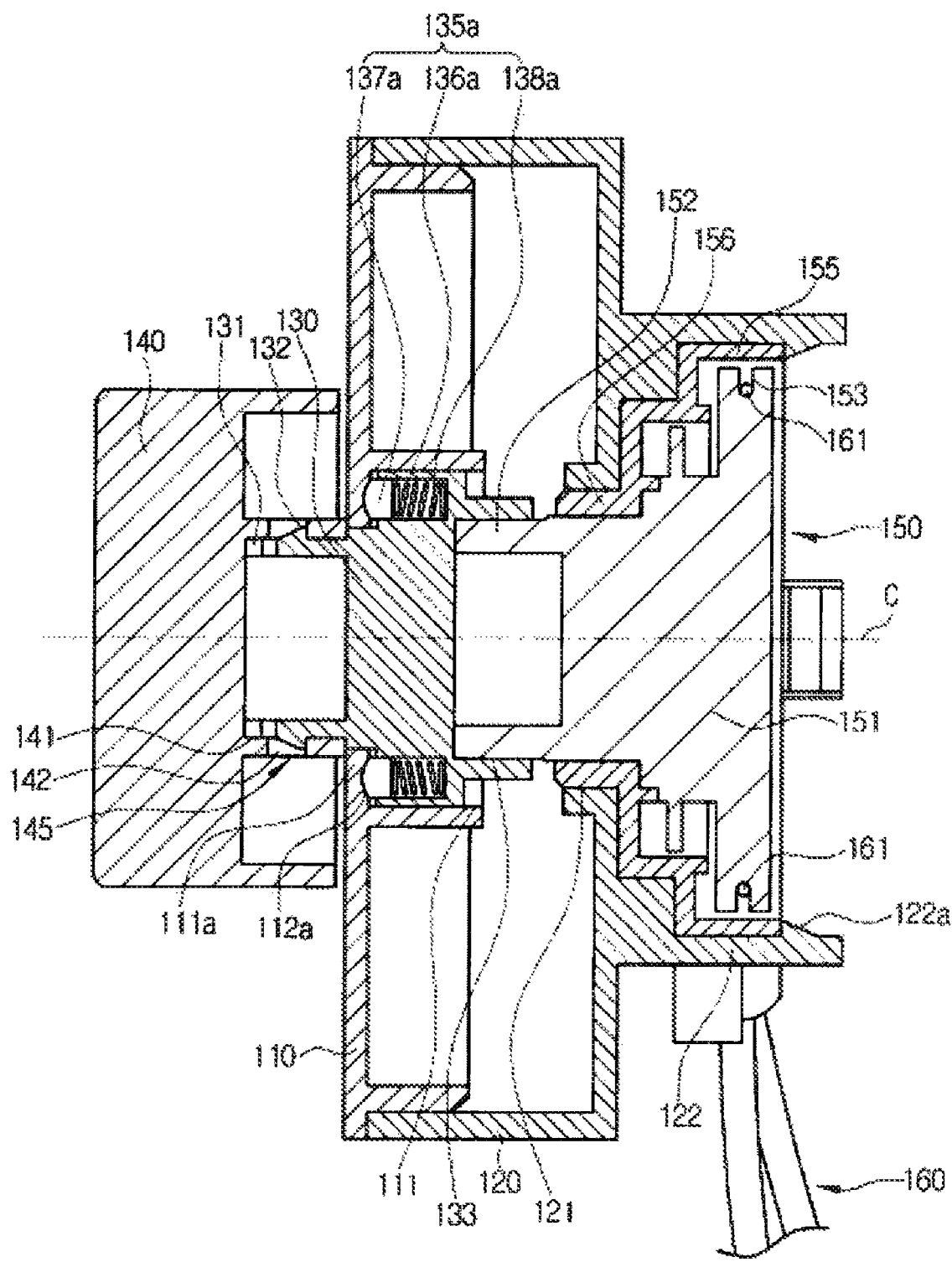

[FIG. 8]
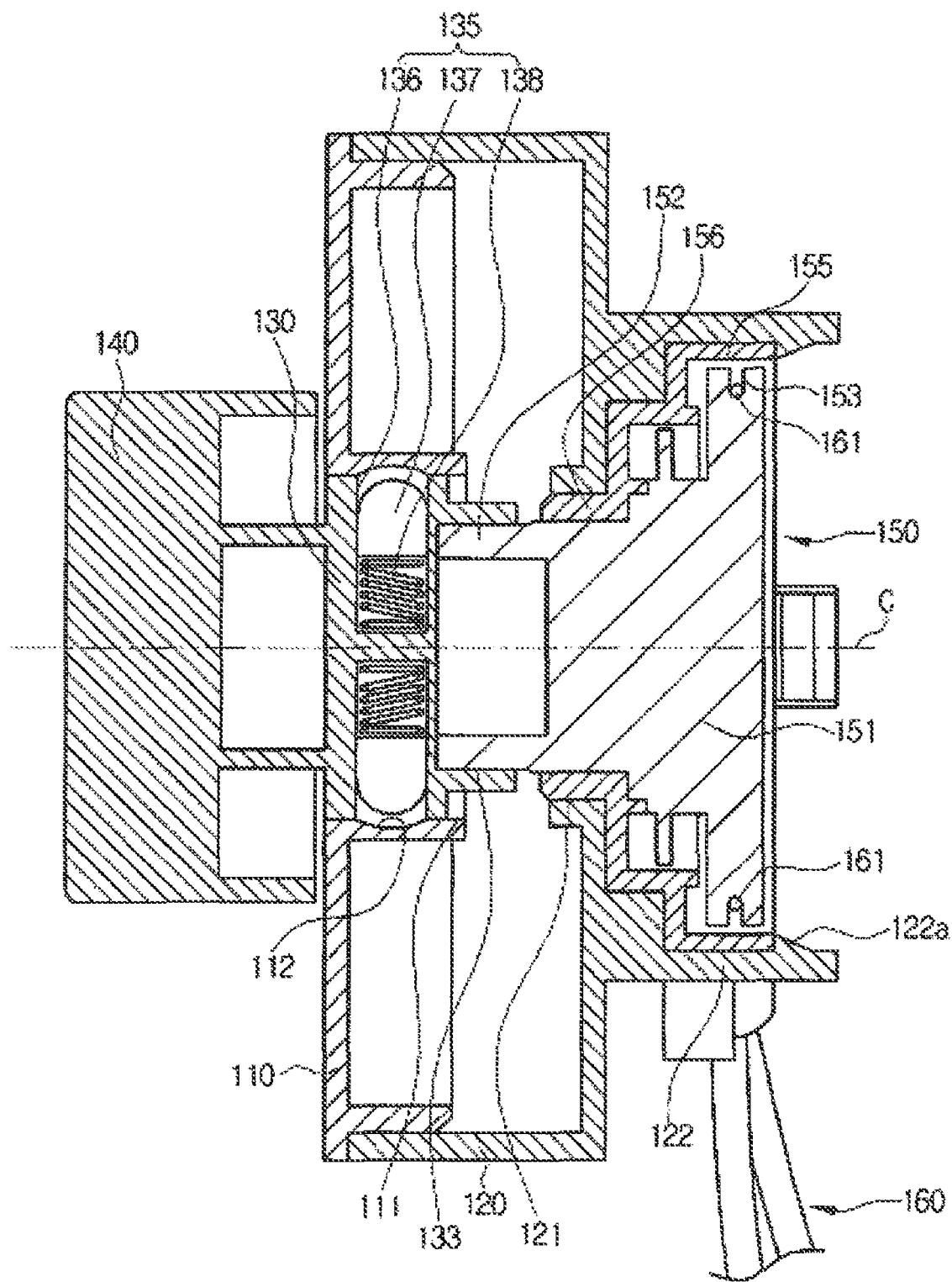

[FIG. 9]
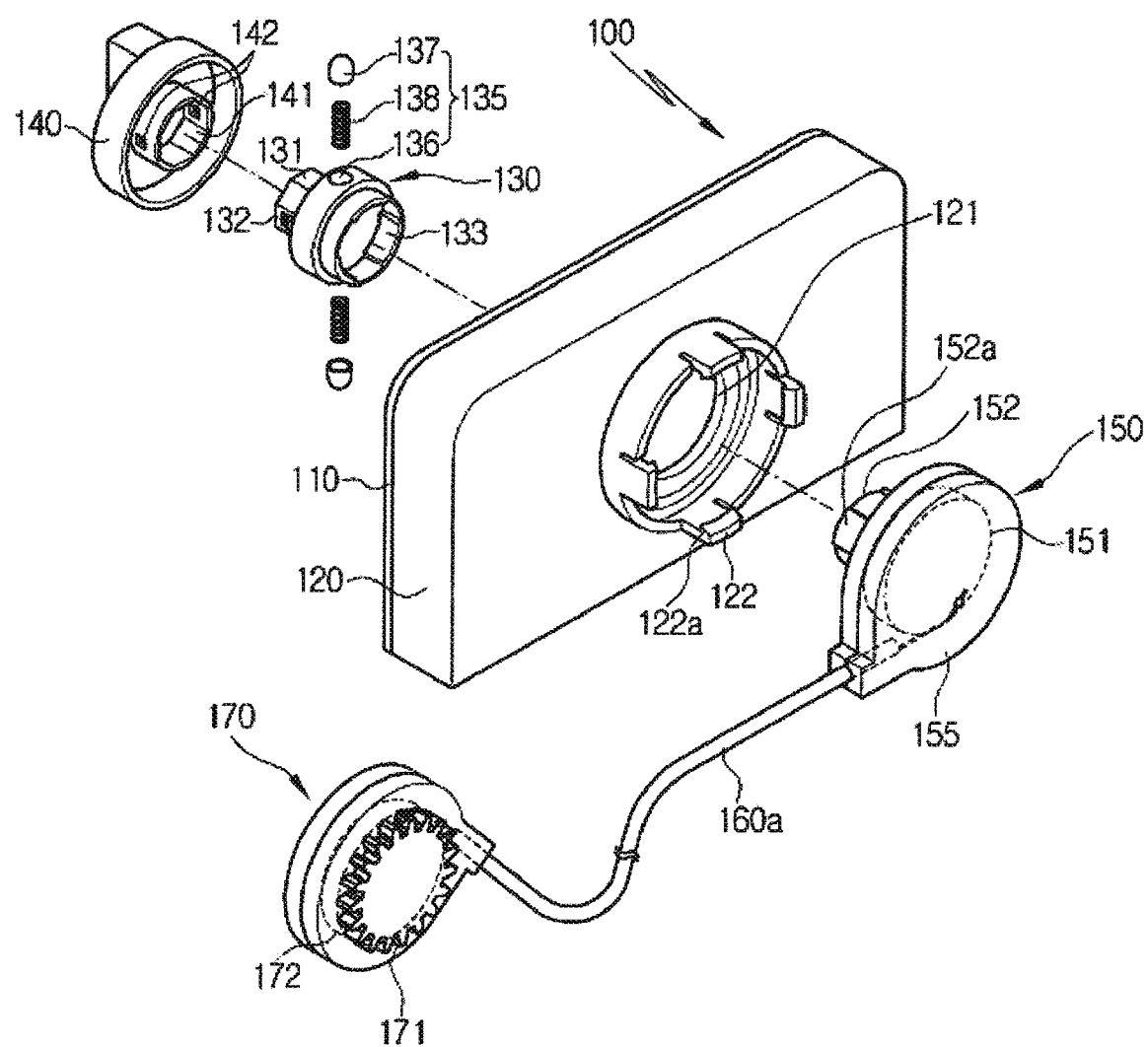

ROTARY SWITCH ASSEMBLY FOR AIR CONDITIONER IN VEHICLE

RELATED APPLICATIONS

This application claims priority from Korean Patent Application No. KR-2008-24431 filed Mar. 17, 2008 and KR-2009-19098 filed Mar. 6, 2009, each of which is incorporated herein by reference in its entirety.

BACKGROUND OF THE INVENTION

1. Field of the Invention

The present invention relates to a rotary switch assembly for an air conditioner in a vehicle, and more particularly, to a rotary switch assembly for an air conditioner in a vehicle, in which detent means is mounted on a holder joined to a front housing to mount a knob on the holder, so that a cable switch assembly for operating a cable to control the air conditioner can be used to various switches in common without regard to existence and nonexistence of a detent structure or positions of the detent structure and the rotary switch assembly can prevent a movement of the knob and effectively transfer a manipulation force of the knob to the cable switch assembly since the detent means is mounted on the holder adjacent to the knob.

2. Background Art

In general, an air conditioner for vehicles is a car interior component, which is installed in the vehicle heat for the purpose of cooling the inside of the vehicle in the summer season or the winter season or removing frost from a windshield in rainy season or winter season to thereby secure a driver's front and rear visual field. Since such an air conditioner typically includes an evaporator and a heater core together, so that it heats, cools or ventilates the inside of the vehicle through the steps of selectively introducing the inside air or the outside air to the air conditioner, heating or cooling the introduced air, and blowing the heated or cooled air to the inside of the vehicle through vents of an air-conditioning case.

In such an air conditioner, a mixed ratio of air passed the evaporator and air passed the heater core is controlled by a temperature-adjusting door, and air moving toward the vents is controlled in its discharge direction by mode doors respectively mounted on the vents. For instance, the air is controlled by a vent mode for discharging the air toward the upper part of a passenger's body, a foot mode for discharging the air toward the passenger's feet, a bi-level mode for simultaneously discharging the air toward the upper part of the passenger's feet and the passenger's feet, and a defrost mode for removing frost or steam from a vehicle window by discharging the air toward the vehicle window.

In order to set a predetermined mode out of the air-conditioning modes, a controller is mounted on a center fascia panel of the vehicle, and the controller includes various switches mounted on a housing fixed on the center fascia panel.

The switches are divided into a button type switch for allowing the passenger to press a button according to a selected operation mode, a lever type switch, in which a lever is joined at a position corresponding to a selected operation mode, and a rotary type switch for allowing the passenger to select an operation mode according to an angle position of a rotatable knob.

The button type switch controls a mode by regulating electric power supplied to the switch, and the rotary type switch is manufactured in such a way that the rotatable knob is assembled relative to a switch body, and in this instance, the rotary type switch can control the mode by corresponding the angle position of the knob with the operation mode of the switch body.

As shown in FIG. 1, the switch assembly 1 including the switches of various types has a structure that a plurality of the switches of different functions and structures are mounted on a housing 2. That is, an air volume switch 3 for adjusting a wind speed, a mode switch 4 for determining a discharge direction of air, a temperature-adjusting switch 5 for adjusting a wind temperature, and an air-conditioner switch (not shown) for turning on/off the air conditioner are mounted on one housing 2.

Furthermore, the rotary type switches such as the temperature-adjusting switch 5 and the mode switch 4 are divided into cable type switches and electric switches according to their operation methods. Hereinafter, only the cable type switch will be described.

As shown in FIG. 2, the cable type rotary switch 10 generally includes: a gear shaft 20 having one end portion rotatably supported on a boss 12 formed on the inner bottom face of a housing 11; a gear lever 30 rotatably mounted on the circumference of the boss 12 in such a way as to be gear-coupled to the gear shaft 20, the gear lever 30 being connected with the temperature-adjusting door or a mode door of the air conditioner through a cable 40; and a knob 25 joined to an end portion of the gear shaft 20 protruding outwardly from the housing 11. The gear shaft 20 adopts a beveled tooth form and the gear lever 30 adopts an arced tooth form corresponding to the form of the gear shaft 20.

Moreover, the knob 25 protrudes toward the front of the housing 11 in such a way as to allow a driver to rotate it.

In the conventional cable type rotary switch 10 having the above structure, since the gear shaft 20 is rotated by the rotation of the knob 25 and the gear lever 30 gear-coupled to the gear shaft 20 is also rotated, the cable 40 connected to the gear lever 30 is moved back and forth in interlock with the gear lever 30. In this instance, when the cable 40 is moved back and forth, a cam and levers, which are mounted in the air conditioner and connected with the cable 40, are also rotated, and then, the temperature-adjusting door or the mode doors interlocked with the cam and the levers are actuated.

Additionally, U.S. Pat. No. 5,235,866 discloses another example of the cable type rotary switch 50. Referring to FIGS. 3a and 3b, the cable type rotary switch disclosed in U.S. Pat. No. 5,235,866 will be described in brief. The cable type rotary switch 50 according to the prior art includes: a control panel 51; a shaft 52 rotatably mounted on the control panel 51 and having a driving gear 53 formed on an outer circumferential face thereof; and a cable switch assembly 60 mounted behind the control panel 51 and connected with the driving gear 53 of the shaft 52 through a driven gear 62 formed at one side thereof in order to operate a pair of cables for controlling the air conditioner.

The cable switch assembly 60 includes: a housing 65 joined behind the control panel 51; a pulley 61 rotatably mounted on the housing 65 and gear-coupled with the driving gear 52 of the shaft 52 through the driven gear 62 formed on one side thereof; and a pair of cables 55 having one side wound on the pulley 61 and the other side connected with the air conditioner to control the air conditioner.

Accordingly, when the passenger rotates the shaft 2 in a forward direction or in a reverse direction, the pulley 61 of the cable switch assembly 60 connected with the driving gear 53 through the driven gear 62 is rotated. After that, when the pulley 61 is rotated in the forward direction or in the reverse direction, while the cables 55 are wound on or released from the pulley 61, the cam and the levers of the air conditioner connected with the other side of the cable 55 are rotated, and hence, the temperature-adjusting door and the mode doors interlocked with the cams and the levers are actuated.

In the meantime, the cable switch assembly 60 for controlling the air conditioner by winding or releasing the cables 55 on or from the pulley can be designed freely since there is no restriction in route of the cable 55.

As described above, the temperature-adjusting switch 5 and the mode switch 4 belong to the cable type rotary switch 50. In this instance, while the temperature-adjusting switch 5 does not have a detent structure, the mode switch 4 has the detent structure constructed in the cable switch assembly 60 to provide a suspension sense every mode position when the shaft 52 is rotated.

That is, the detent structure of the cable switch assembly 60 includes a detent portion 63 formed on the outer circumferential face of the pulley 61; and a detent spring 66 mounted on the housing 65, on which the pulley 61 is mounted, the detent spring 66 giving the suspension sense while elastically touching the detent portion 63.

Accordingly, when the passenger rotates the shaft 52, the detent spring 66 is elastically caught to the detent portion 63 of the pulley 61 during the rotation of the pulley 61, and hence, the passenger can more conveniently and exactly change a mode since the passenger can feel the suspension sense every specific rotational position (position of each mode) when the shaft 52 is rotated.

However, the conventional cable type rotary switch 50 has a problem in that it is impossible to use the cable switch assembly 60 to the temperature-adjusting switch 5 and the mode switch 4 in common since the detent structure is constructed inside the cable switch assembly 60.

That is, since the detent structure is formed integrally with the pulley 61, it is difficult to use the cable switch assembly 60 in common according to existence and nonexistence of the detent structure or positions of the detent structure, and hence, it increases a manufacturing cost.

SUMMARY OF THE INVENTION

Accordingly, the present invention has been made to solve the above-mentioned problems occurring in the prior arts, and it is an object of the present invention to provide a rotary switch assembly for an air conditioner in a vehicle, in which detent means is mounted on a holder joined to a front housing to mount a knob on the holder, so that a cable switch assembly for operating a cable to control the air conditioner can be used to various switches in common without regard to existence and nonexistence of a detent structure or positions of the detent structure and the rotary switch assembly can prevent a movement of the knob and effectively transfer a manipulation force of the knob to the cable switch assembly since the detent means is mounted on the holder adjacent to the knob.

To accomplish the above object, according to the present invention, there is provided a rotary switch assembly for an air conditioner in a vehicle comprising: housings coupled with each other; a holder rotatably mounted in a through hole formed on the housing in a back and forth direction; a knob located on a front face of the housing and joined with the holder; detent means mounted between the holder and the housing, the detent means providing a click feeling every specific rotational position when the knob is rotated; and a cable switch assembly detachably connected with the holder for operating the cable by receiving a manipulation force of the knob through the holder.

In another aspect, to accomplish the above object, according to the present invention, there is provided a rotary switch assembly for an air conditioner in a vehicle including: housings coupled with each other; a plurality of holders spaced apart from one another at predetermined intervals and rotatably mounted in a plurality of through holes formed on the housing in a back and forth direction; a plurality of knobs located on a front face of the housing and joined with the plural holders; a plurality of detent means mounted between the plural holders and the housing, the detent means being in different forms to provide a click feeling every specific rotational position of the knobs when the plural knobs are rotated; and a plurality of cable switch assemblies of the same form being detachably connected with the plural holders, the plural cable switch assemblies receiving a manipulation force of the plural knobs through the holders to operate cables for controlling the air conditioner.

According to the present invention, since the detent means is mounted on the holder joined to the front housing to mount the knob on the holder, the cable switch assembly for operating a cable to control the air conditioner can be used to various switches in common without regard to existence and nonexistence of the detent structure or positions of the detent structure, and hence, a manufacturing cost is reduced.

Moreover, since the detent means is mounted on the holder adjacent to the knob, the rotary switch assembly can prevent a movement of the knob, enhance a manipulation feeling, and effectively transfer a manipulation force of the knob to the cable switch assembly.

Furthermore, the present invention can increase a sense of unity between the knob and the holder and prevent a torsion when the knob is rotated since a diameter of the holder supporting the knob is large.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a perspective view showing a conventional switch assembly;

FIG. 2 is a perspective view showing a conventional cable type rotary switch;

FIGS. 3a and 3b are perspective views showing another conventional cable type rotary switch;

FIG. 4 is a perspective view of a rotary switch assembly according to the present invention;

FIG. 5 is an exploded perspective view of the rotary switch assembly according to the present invention;

FIG. 6 is a sectional view taken along the line of A-A of FIG. 4;

FIG. 7 is a sectional view showing another example of detent means of FIG. 6;

FIG. 8 is a sectional view showing a case where a knob and a holder of FIG. 6 are formed integrally with each other; and FIG. 9 is an exploded perspective view showing a case where a cable switch assembly using a single cable is mounted on the rotary switch assembly according to the present invention.

DETAILED DESCRIPTION OF THE PREFERRED EMBODIMENT

Reference will be now made in detail to the preferred embodiment of the present invention with reference to the attached drawings.

The same parts as the prior art have the same reference numerals as the prior art.

FIG. 4 is a perspective view of a rotary switch assembly according to the present invention, FIG. 5 is an exploded perspective view of the rotary switch assembly, FIG. 6 is a sectional view taken along the line of A-A of FIG. 4, FIG. 7 is a sectional view showing another example of detent means of FIG. 6, FIG. 8 is a sectional view showing a case where a knob and a holder of FIG. 6 are formed integrally with each other, and FIG. 9 is an exploded perspective view showing a case where a cable switch assembly using a single cable is mounted on the rotary switch assembly.

As shown in the drawings, the rotary switch assembly 100 for an air conditioner in a vehicle according to the present invention includes housings 110 and 120 mounted on a center fascia panel of the vehicle, a holder 130, a knob 140, detent means 135, and a cable switch assembly 150.

First, the housings 110 and 120 are a front housing 110, on which the holder 130 is rotatably mounted, and a rear housing 120 joined to the front housing 110, and in this instance, the cable switch assembly 150 is detachably joined to the rear housing 120. The front housing 110 includes a through hole 111 formed therein in a back and forth direction in such a way that the holder 130 can be mounted thereon. Here, the through hole 111 includes a stepped jaw portion 111a formed at one side thereof.

In the meantime, the housings 110 and 120 are separately manufactured into the front housing 110 and the rear housing 120 and assembled with each other in the present invention, but may be manufactured as a single housing.

Furthermore, the holder 130 is rotatably inserted and joined into the through hole 111 of the front housing 110. The holder 130 includes a projection portion 131 formed on a front face thereof and a coupling recess portion 133 formed on a rear face thereof in such a way as to be coupled with the cable switch assembly 150.

In this instance, the projection portion 131 of the holder 130 projects to a predetermined length toward the front face of the front housing 110 to be coupled with the knob 140.

The knob 140 is located on a front face of the front housing 110 and coupled with the holder 130 through coupling means 145.

The coupling means 145 includes: the projection portion 131 formed on one of coupled faces of the holder 130 and the knob 140; and an insertion recess portion 141 formed on the other one of the coupled faces and coupled with the projection portion 131.

In the drawings, the projection portion 131 is protrudingly formed on the front face of the holder 130 and includes a hook 132 protrudingly formed on an outer circumferential face thereof, which has at least one plane.

Moreover, the insertion recess portion 141 is formed on a rear face of the knob 140 in such a way as to correspond to the form of the outer circumferential face of the projection portion 131 and includes a recess 142 formed in such a way that the hook 132 is caught to the recess 142.

Here, it is preferable that a part of the projection portion 131 in the vicinity of the hook 132 is cut to thereby provide elasticity to the hook 132. In the drawings, two hooks 132 are formed, but the number of the hooks 132 can be changed freely.

Additionally, it is preferable that the outer circumferential face of the projection portion 131 of the holder 130 is in a polygonal form and the insertion recess portion 141 of the knob 140 is also in a polygonal form corresponding to the projection portion 131. Of course, the outer circumferential face of the projection portion 131 and the insertion recess portion 141 may be formed in a recess and protrusion shape (not shown).

Accordingly, when the knob 140 is rotated, there is no slide between the knob 140 and the holder 130.

In the meantime, the knob 140 and the holder 130 may be detachably coupled with each other through the coupling means 145, but may be formed integrally with each other as shown in FIG. 8.

That is, since the integrated knob 140 and holder 130 and the cable switch assembly 150 are assembled with each other in a state where the housings 110 and 120 are interposed therebetween, the structure and assembly of the present invention can be simplified.

In this instance, the integrated knob 140 and holder 130 can be simply assembled to the front face of the front housing 110, and the holder 130 of the knob 140 and a rotary shaft 152 of the cable switch assembly 150 are joined integrally and rotatably.

Furthermore, the detent means 135 is mounted between the holder 130 and the front housing 110, and provides the suspension sense every specific rotation position when the knob 140 is rotated.

Moreover, the detent means 135 is not used in the temperature-adjusting switch, but is constructed in the mode switch to provide the suspension sense every air-conditioning mode when the knob 140 is rotated.

The detent means 135 includes: a detent cap 137 elastically mounted in a receiving hole 136 of a predetermined depth, which is formed in the outer circumferential face of the holder 130, via an elastic member 138 interposed between the detent cap 137 and the receiving hole 136; and a retaining recess 112 formed on an inner circumferential face of the through hole 111 of the front housing 110 opposed to the detent cap 137 in such a way that the detent cap 137 is elastically caught thereto when the knob 140 is rotated.

In the drawings, the receiving hole 136 and the detent cap 137 are formed by twos in the opposite directions relative to the holder 130, but may be formed only one by one.

Additionally, the detent cap 137 and the elastic member 138 may be formed as separate members or as an integrated member.

In addition, a plurality of the retaining recesses 112 are formed on the inner circumferential face of the through hole 111 of the front housing 110, and in this instance, the recesses 112 are formed at positions corresponding to the air-conditioning modes to change the air-conditioning mode of the air conditioner by rotating the knob 140.

Accordingly, when the passenger rotates the knob 140, the detent cap 137 mounted on the holder 130 rotates along the inner circumferential face of the through hole 111 to provide the suspension sense every position where the detent cap 137 is elastically caught to the plural retaining recesses 112, so that the passenger can more conveniently and exactly change the air-conditioning mode.

In the meantime, the temperature-adjusting switch does not need the detent means since it increases and decreases temperature by rotating the knob 140 in the forward direction or in the reverse direction.

Furthermore, FIG. 7 illustrates another example of the detent means 135a. In FIG. 7, the detent means 135a includes: a detent cap 137a elastically mounted in a receiving hole 136a of a predetermined depth, which is formed in one side of the holder 130 facing the knob 140, via an elastic member 138a interposed between the detent cap 137a and the receiving hole 136a; and a retaining recess 112a formed on an inner surface of the front housing 110 opposed to the detent cap 137a in such a way that the detent cap 137 is elastically caught thereto when the knob 140 is rotated.

As described above, since the present invention has the detent means 135 or 135a disposed between the holder 130 and the front housing 110, the detent structures of various forms as shown in FIGS. 6 and 7 can be constructed.

Moreover, the cable switch assembly 150 is detachably connected with the holder 130 and receives a manipulation force of the knob 140 through the holder 130 to thereby operate a cable 160 controlling the air conditioner.

Here, a single cable 160 or a pair of cables 160 may be used.

First, as shown in the drawings, in case of a pair of cables 160, the cable switch assembly 150 includes: a case 155 joined to a rear face of the rear housing 120; and a rotor 151 rotatably mounted inside the case 155 in such a way that end portions 161 of the cables 160 for controlling the air conditioner are wound on an outer circumferential face thereof in the opposite directions to each other, the rotor 151 having a rotor shaft 152 protrudingly formed on a front face thereof in such a way as to be detachably mounted on a rear face of the holder 130.

The rotor 151 has a groove 153 formed on an outer circumferential face thereof, and the end portions 161 of the cables 160 inserted into the case 155 are fixed to the groove 153 in such a way as to be wound or released in the opposite directions to each other. That is, when the rotor 151 is rotated in one direction, while one of the cables 160 is gradually wound on the groove 153 of the rotor 151, the other of the cables 160 is gradually released from the groove 153 of the rotor 151.

As described above, when the rotor 151 of the cable switch assembly 150 mounted at one end portion 161 of the cable 160 is rotated, a rotor (not shown) of another cable switch assembly 170 mounted at the other end portion of the cable 160 is also rotated in interlock with the rotor 151.

Next, as shown in FIG. 9, in case of the single cable 160a, the cable switch assembly 150 includes: a case 155 joined to a rear face of the rear housing 120; and a rotor 151 rotatably mounted inside the case 155 in such a way that one end portion of the single cable 160a for controlling the air conditioner is wound on an outer circumferential face thereof, the rotor 151 having a rotor shaft 152 protrudingly formed on a front face thereof in such a way as to be detachably mounted on a rear face of the holder 130.

As described above, in case of the single cable 160a, while the one end portion of the single cable 160a inserted into the case 155 is wound on or released from the outer circumferential face of the rotor 151, a rotor 172 of another cable switch assembly 170 mounted on the other end portion of the cable 160a is rotated.

In the meantime, the cable switch assemblies 150 and 170 are mounted on both end portions of the cable 160, wherein the cable switch assembly 150 mounted on one end portion of the cable 160 has the structure that the rotor shaft 152 is formed on the rotor 151 to be coupled with the holder 130 and the cable switch assembly 170 mounted on the other end portion of the cable 160 has a structure that a gear portion 171 is formed on one side of the rotor to actuate a cam (not shown) and levers (not shown), which are actuating means for actuating a temperature-adjusting door (not shown) or a mode door (not shown) of the air conditioner. In this instance, the gear portion 171 of the rotor is mounted in such a way as to be gear-coupled with a gear portion (not shown) formed on the cam.

Accordingly, when the rotor 151 of the cable switch assembly 150 mounted on the one end portion of the cable 160 is rotated in the forward direction or in the reverse direction, the rotor of the cable switch assembly 170 mounted on the other end portion of the cable 160 is also rotated in the forward direction or in the reverse direction.

That is, the rotor 151 of the cable switch assembly 150 mounted on the one end portion of the cable 160 transfers a manipulation force of the knob 140 to the one end portion of the cable 160 since it connects the holder 130 and the one end portion of the cable 160 with each other.

Moreover, the rotor of the cable switch assembly 170 mounted on the other end portion of the cable 160 transfers the manipulation force of the knob 140 transferred through the cable to the actuating means of the air conditioner.

Here, it is preferable that the actuating means is the cam rotatably mounted on the outer face of the air conditioner to actuate the temperature-adjusting door or the mode doors mounted inside the air conditioner. That is, when the cam, which is the actuating means, engaging with the gear portion 171 of the rotor of the cable switch assembly 170 is rotated, the levers interlocked with the cam actuate the doors.

Additionally, the rear housing 120 includes a plurality of joining portions 122 for detachably joining the cable switch assembly 150. That is, the plural joining portions are formed on the rear face of the rear housing 120 along the circumference of the case 155, and each of the joining portions has a hook 122a protrudingly formed on an inner face thereof.

Accordingly, when the case 155 is inserted into the plural joining portions 122 in order to join the cable switch assembly 150 to the rear face of the rear housing 120, the outer circumferential face of the case 155 is caught to the hook 122a of the joining portion 122 so that the case 155 is joined to the rear housing 120. Moreover, when the joining portion 122 is stretched out, the cable switch assembly 150 can be easily separated from the joining portion 122.

Furthermore, if there is no rear housing 120, the holder 130 or other structure may have a joining portion to support and fix the case 155.

In the meantime, the joining portion 122 is provided to fix the case 155 to the rear face of the housing 1200, and in this instance, the rotor 155 is relatively rotatable.

Additionally, a projection portion 156 protrudingly formed on one side of the case 155 for rotatably supporting the rotor shaft 152 of the rotor 151 is forcedly fit to the through hole 121 of the rear housing 120.

In addition, the rotor shaft 152 of the rotor 151 passes through the projection portion 156 of the case 155 and coupled to the rear face of the holder 130. In this instance, one of the coupled faces of the rotor shaft 152 and the holder 130 has a portion 152a and the other one has a recessed portion 133 joined with the recess and protrusion portion 152a.

In the drawings, the recess and protrusion portion 152a is formed on the outer circumferential face of the rotor shaft 152, and the recessed portion 133 is formed on the rear face of the holder 130, which is joined with the rotor shaft 152, in such a way as to be formed correspondingly to the outer circumferential face of the rotor shaft 152. Here, the recessed portion 133 of the holder 130 and the outer circumferential face of the rotor shaft 152 may be formed not in the recess and protrusion form but in a polygonal form.

Accordingly, there is no slide between the holder 130 and the rotor shaft 152, which are joined with each other, during the rotation.

In the meantime, the knob 140, the holder 130, and the cable switch assembly 150 are arranged on one rotary axis (C) and operated integrally. That is, the knob 140, the holder 130, and the cable switch assembly 150 are all arranged in concentric circles and directly connected with one another to be operated integrally.

The holder 130 described above has various functions as follows.

First, since the holder 130 directly transfers the manipulation force of the knob 140 to the cable switch assembly 150, it is more simplified in structure than a gear, which indirectly transfers the manipulation force, and transfers the manipulation force more smoothly and securely.

Second, the holder 130 has the detent structure to provide the suspension sense (moderation feeling) when the knob 140 is rotated.

Third, since the holder 130 is detachably joined to the cable switch assembly 150, the cable switch assembly 150 is modulated and detachably assembled to switches (temperature-adjusting switch, mode switch, and so on) without regard to existence and nonexistence of the detent portion or positions of the detent structure, so that the holder 130 can be used in common.

Furthermore, a case that a plurality of the rotary switches, each of which includes the knob 140, the holder 130, the detent means 135 or 135a, and the cable switch assembly 150, are mounted on the housing 110 and 120 will be described in brief.

The front housing 110 has a plurality of the through holes 111 spaced apart from one another at predetermined intervals, and a plurality of the holders 130 are rotatably mounted on the plural through holes 111.

Moreover, a plurality of the knobs 140 are joined to the plural holders 130 on the front face of the front housing 110.

A plurality of the detent means 135 and 135a of different forms are respectively mounted between the plural holders 130 and the housing 110 in such a way as to provide the suspension sense at different rotational positions of the knobs 140 when the plural knobs 140 are rotated.

That is, in case that the plural rotary switches performing different functions (temperature, air-conditioning mode, air volume, and so on) to control the air conditioner are mounted on the housings 110 and 120, since the plural rotary switches respectively perform different functions, the plural detent means 135 and 135a of different forms are mounted at the different rotational positions of the knobs 140 of the rotary switches.

Furthermore, in order to receive the manipulation force of the plural knobs 140 through the holders 130 to operate the cables 160 controlling the air conditioner, a plurality of the cable switch assemblies 150 of the same form are detachably connected and mounted to the plural holders 130.

That is, even though the plural detent means 135 and 135a are mounted on the plural rotary switches in different forms or omitted, the plural cable switch assemblies 150 can be used to the rotary switches in common since they are detachably assembled in the same form.

As described above, the rotary switch assembly 100, in which the detent means 135 or 135a is mounted on the holder 130, is suitable to the mode switch, and can be used to the temperature-adjusting switch in a state where the detent means 135 mounted on the holder 130 is removed. Then, the cable switch assembly 150 detachably joined to the rear housing 120 and connected with the holder 130 can be used to different switches, such as the mode switch and the temperature-adjusting switch, in common without regard to existence and nonexistence of the detent structure and positions of the detent structure, and reduce the manufacturing cost.

Furthermore, since the detent means 135 or 135a is mounted on the holder 130 adjacent to the knob 140, the detent means 135 or 135a supports the holder 130 via elasticity of the elastic member 138 or 138a to thereby prevent a movement of the knob 140, enhance the manipulation feeling, and effectively transfer the manipulation force of the knob 140 to the cable switch assembly 150.

Additionally, since a diameter of the holder 130 rotatably supporting the knob 140 is large, a sense of unity between the knob 140 and the holder 130 is increased, and hence, it can prevent a torsion when the knob 140 is rotated.

Hereinafter, an action of the rotary switch assembly 100 for the air conditioner in the vehicle according to the present invention will be described.

First, when the passenger rotates the knob 140, the holder 130 joined with the knob 140 is rotated.

In this instance, while the detent cap 137 or 137a mounted on the holder 130 is rotated in the through hole 111 of the front housing 110, since the passenger feels suspension every position where the detent cap is elastically caught to the plural retaining recesses 112 or 112a, the passenger can more conveniently and exactly change the air-conditioning mode.

Continuously, when the holder 130 is rotated, the rotor 151 of the cable switch assembly 150 connected with the holder 130 is rotated, and at the same time, the rotor of the cable switch assembly 170, which is mounted on the air conditioner, connected with the rotor 151 via the cable 160 is also rotated.

After that, when the rotor of the cable switch assembly 170 mounted on the air conditioner is rotated, the cam of the air conditioner engaged with the gear portion 171 of the rotor is rotated and operates the levers, and hence, the temperature-adjusting door or the mode doors interlocked with the levers are actuated.

In the meantime, when the insertion recess portion 141 of the knob 140 is joined to the projection portion 131 of the holder 130, the knob 140 can be easily assembled since the hook 132 of the projection portion 131 is caught to the recess 142 formed on the insertion recess portion 141.

Moreover, the cable switch assembly 150 can be also conveniently detachably assembled through the joining portions 122 formed on the rear face of the rear housing 120.

As described above, the case that the rotary switch assembly 100 according to the present invention is applied to the air conditioner in the vehicle is described, but the present invention is not restricted to the above and is applicable to various fields in the same way.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A rotary switch assembly for an air conditioner in a vehicle comprising:
    housings coupled with each other;
    a holder rotatably mounted in a through hole formed on the housing in a back and forth direction;
    a knob located on a front face of the housing and joined with the holder;
    detent means mounted between the holder and the housing, the detent means providing a click feeling every specific rotational position when the knob is rotated; and
    a cable switch assembly detachably connected with the holder for operating the cable by receiving a manipulation force of the knob through the holder,
    wherein the cable switch assembly comprises a rotor for connecting the holder with one end portion of the cable to thereby transfer a manipulation force of the knob to the one end portion of the cable, and another cable switch assembly having a rotor for connecting the other end portion of the cable with actuating means of the air conditioner is mounted on the other end portion of the cable to thereby transfer the manipulation force of the knob, which is transferred through the cable to the actuating means of the air conditioner.

2. The rotary switch assembly according to claim 1, wherein the housing comprises a plurality of joining portions protrudingly formed on a rear face thereof in such a way that the cable switch assembly is detachably joined thereto.

3. The rotary switch assembly according to claim 2, wherein the joining portions are joined with an outer face of a case of the cable switch assembly to fix the case to a rear face of the housing and a rotor for operating the cable is mounted inside the case in such a way as to be rotated relatively.

4. A rotary switch assembly for an air conditioner in a vehicle comprising:
   housings coupled with each other;
   a holder rotatably mounted in a through hole formed on the housing in a back and forth direction;
   a knob located on a front face of the housing and joined with the holder;
   detent means mounted between the holder and the housing, the detent means providing a click feeling every specific rotational position when the knob is rotated; and
   a cable switch assembly detachably connected with the holder for operating the cable by receiving a manipulation force of the knob through the holder,
   wherein the cable switch assembly comprises:
   a case joined to a rear face of the housing; and
   a rotor rotatably mounted inside the case in such a way that end portions of a pair of the cables for controlling the air conditioner are wound on an outer circumferential face thereof in the opposite directions to each other, the rotor having a rotor shaft protrudingly formed on a front face thereof in such a way as to be detachably mounted on a rear face of the holder.

5. The rotary switch assembly according to claim 4, wherein one of the coupled faces of the rotor shaft and the holder has a recess and protrusion portion and the other one has a recessed portion joined with the recess and protrusion portion.

6. A rotary switch assembly for an air conditioner in a vehicle comprising:
   housings coupled with each other;
   a holder rotatably mounted in a through hole formed on the housing in a back and forth direction;
   a knob located on a front face of the housing and joined with the holder;
   detent means mounted between the holder and the housing, the detent means providing a click feeling every specific rotational position when the knob is rotated; and
   a cable switch assembly detachably connected with the holder for operating the cable by receiving a manipulation force of the knob through the holder,
   wherein the cable switch assembly comprises:
   a case joined to a rear face of the housing; and
   a rotor rotatably mounted inside the case in such a way that one end portion of a single cable for controlling the air conditioner is wound on an outer circumferential face thereof, the rotor having a rotor shaft protrudingly formed on a front face thereof in such a way as to be detachably mounted on a rear face of the holder.

7. The rotary switch assembly according to claim 1, wherein the housings are a front housing on which the holder is rotatably mounted and a rear housing joined to the front housing in such a way that the cable switch assembly is detachably joined thereto.

8. The rotary switch assembly according to claim 1, wherein the knob, the holder, and the cable switch assembly are arranged on one rotary axis and operated integrally.

9. The rotary switch assembly according to claim 1, wherein the knob and the holder are formed integrally.

10. The rotary switch assembly according to claim 1, wherein the detent means comprises:
    a detent cap elastically mounted in a receiving hole formed in the outer circumferential face of the holder via an elastic member interposed between the detent cap and the receiving hole; and
    a retaining recess formed on the housing opposed to the detent cap in such a way that the detent cap is elastically caught thereto when the knob is rotated.

11. The rotary switch assembly according to claim 1, wherein the detent means comprises:
    a detent cap elastically mounted in a receiving hole formed on one side of the holder, which faces the knob, via an elastic member interposed between the detent cap and the receiving hole; and
    a retaining recess formed on the housing opposed to the detent cap in such a way that the detent cap is elastically caught thereto when the knob is rotated.

12. The rotary switch assembly according to claim 1, wherein the knob is coupled with the holder through coupling means, the coupling means comprising:
    a projection portion formed on one of coupled faces of the holder and the knob; and
    an insertion recess portion formed on the other one of the coupled faces and coupled with the projection portion.

13. A rotary switch assembly for an air conditioner in a vehicle comprising:
    housings coupled with each other;
    a plurality of holders spaced apart from one another at predetermined intervals and rotatably mounted in a plurality of through holes formed on the housing in a back and forth direction;
    a plurality of knobs located on a front face of the housing and joined with the plural holders;
    a plurality of detent means mounted between the plural holders and the housing, the detent means being in different forms to provide a click feeling every specific rotational position of the knobs when the plural knobs are rotated; and
    a plurality of cable switch assemblies of the same form being detachably connected with the plural holders, the plural cable switch assemblies receiving a manipulation force of the plural knobs through the holders to operate cables for controlling the air conditioner,
    wherein the cable switch assembly comprises a rotor for connecting the holder with one end portion of the cable to thereby transfer a manipulation force of the knob to the one end portion of the cable, and another cable switch assembly having a rotor for connecting the other end portion of the cable with actuating means of the air conditioner is mounted on the other end portion of the cable to thereby transfer the manipulation force of the knob, which is transferred through the cable to the actuating means of the air conditioner.

14. The rotary switch assembly according to claim 13, wherein the housing comprises a plurality of joining portions protrudingly formed on a rear face thereof in such a way that the cable switch assembly is detachably joined thereto.

15. A rotary switch assembly for an air conditioner in a vehicle comprising:
    housings coupled with each other;

a plurality of holders spaced apart from one another at predetermined intervals and rotatably mounted in a plurality of through holes formed on the housing in a back and forth direction;

a plurality of knobs located on a front face of the housing and joined with the plural holders;

a plurality of detent means mounted between the plural holders and the housing, the detent means being in different forms to provide a click feeling every specific rotational position of the knobs when the plural knobs are rotated; and a plurality of cable switch assemblies of the same form being detachably connected with the plural holders, the plural cable switch assemblies receiving a manipulation force of the plural knobs through the holders to operate cables for controlling the air conditioner, wherein the cable switch assembly comprises:

a case joined to a rear face of the housing; and a rotor rotatably mounted inside the case in such a way that end portions of a pair of the cables for controlling the air conditioner are wound on an outer circumferential face thereof in the opposite directions to each other, the rotor having a rotor shaft protrudingly formed on a front face thereof in such a way as to be detachably mounted on a rear face of the holder.

16. A rotary switch assembly for an air conditioner in a vehicle comprising:

housings coupled with each other;

a plurality of holders spaced apart from one another at predetermined intervals and rotatably mounted in a plurality of through holes formed on the housing in a back and forth direction;

a plurality of knobs located on a front face of the housing and joined with the plural holders;

a plurality of detent means mounted between the plural holders and the housing, the detent means being in different forms to provide a click feeling every specific rotational position of the knobs when the plural knobs are rotated; and a plurality of cable switch assemblies of the same form being detachably connected with the plural holders, the plural cable switch assemblies receiving a manipulation force of the plural knobs through the holders to operate cables for controlling the air conditioner, wherein the cable switch assembly comprises:

a case joined to a rear face of the housing; and a rotor rotatably mounted inside the case in such a way that one end portion of a single cable for controlling the air conditioner is wound on an outer circumferential face thereof, the rotor having a rotor shaft protrudingly formed on a front face thereof in such a way as to be detachably mounted on a rear face of the holder.

\* \* \* \* \*